US007009391B2

(12) United States Patent
Lee et al.

(10) Patent No.: US 7,009,391 B2
(45) Date of Patent: Mar. 7, 2006

(54) HIGH THROUGHPUT MISSING PATTERN DETECTOR FOR SERVO PRINTED RECORDING MEDIA

(75) Inventors: Shih-Fu Lee, Fremont, CA (US); David Kuo, Palo Alto, CA (US); Jason L. Pressesky, Menlo Park, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 82 days.

(21) Appl. No.: 10/685,680

(22) Filed: Oct. 15, 2003

(65) Prior Publication Data
US 2005/0083047 A1 Apr. 21, 2005

(51) Int. Cl.
G01R 33/12 (2006.01)
(52) U.S. Cl. ...................................... 324/212
(58) Field of Classification Search ................ 324/210, 324/212; 714/718, 723, 715, 719; 365/200, 365/201; 360/53, 31, 75, 77.08
See application file for complete search history.

(56) References Cited

U.S. PATENT DOCUMENTS

| | | | | |
|---|---|---|---|---|
| 4,876,685 A | * | 10/1989 | Rich | 714/723 |
| 5,563,746 A | * | 10/1996 | Bliss | 360/53 |
| 5,898,499 A | | 4/1999 | Pressesky | 356/357 |
| 5,963,029 A | | 10/1999 | Pressesky | 324/212 |
| 5,991,104 A | | 11/1999 | Bonyhard | 360/15 |
| 5,996,045 A | | 11/1999 | Lee et al. | 711/112 |
| 6,084,739 A | * | 7/2000 | Assouad | 360/77.08 |
| 6,097,561 A | | 8/2000 | Wakefield et al. | 360/51 |
| 6,142,006 A | | 11/2000 | Marchon et al. | 73/1.81 |
| 6,181,492 B1 | | 1/2001 | Bonyhard | 360/17 |
| 6,304,407 B1 | | 10/2001 | Baker et al. | 360/75 |
| 6,359,747 B1 | | 3/2002 | Kuo | 360/75 |
| 6,366,085 B1 | * | 4/2002 | Yeshurun et al. | 324/263 |
| 6,373,243 B1 | | 4/2002 | Takano et al. | 324/212 |
| 6,387,530 B1 | | 5/2002 | Liu et al. | 428/559 |
| 6,396,773 B1 | | 5/2002 | Kuo | 369/13.02 |
| 6,404,590 B1 | | 6/2002 | Kuo et al. | 360/135 |
| 6,405,449 B1 | | 6/2002 | Sundaram et al. | 33/645 |
| 6,466,895 B1 | * | 10/2002 | Harvey et al. | 702/181 |
| 6,476,995 B1 | | 11/2002 | Liu et al. | 360/75 |
| 6,483,299 B1 | | 11/2002 | Pressesky et al. | 324/212 |
| 6,574,068 B1 | | 6/2003 | Hampshire et al. | 360/77.08 |
| 6,580,572 B1 | | 6/2003 | Yao et al. | 360/25 |
| 6,587,293 B1 | | 7/2003 | Ding et al. | 360/51 |
| 6,590,388 B1 | | 7/2003 | Arnaout et al. | 324/210 |
| 6,603,636 B1 | | 8/2003 | Schwandt et al. | 360/99.12 |
| 6,606,211 B1 | | 8/2003 | Lim et al. | 360/53 |
| 6,611,397 B1 | | 8/2003 | Nguyen | 360/77.08 |

(Continued)

*Primary Examiner*—Bot Ledynh
*Assistant Examiner*—Kenneth J. Whittington
(74) *Attorney, Agent, or Firm*—Morrison & Foerster LLP (57) ABSTRACT

The present invention provides a method for detecting missing servo patterns on printed recording media. In general, the method first comprises the step of generating a map of anticipated servo burst patterns for a magnetic medium. The magnetic medium is typically a magnetic storage disc. Next, the magnetic medium is placed onto a disc reading assembly. Using the disc reading assembly, individual servo bursts on the magnetic medium are identified. In one embodiment, signals from the magnetic medium are processed through a frequency down conversion process, coupled with band pass filtering and rms-to-DC conversion. This enables higher throughput of signal processing. A map of identified servo bursts on the magnetic medium can then be generated. The map of identified servo bursts is then compared with the map of anticipated servo burst patterns. In this way, missing servo bursts can be detected.

16 Claims, 8 Drawing Sheets

U.S. PATENT DOCUMENTS

| | | | |
|---|---|---|---|
| 6,615,387 B1 | 9/2003 | Williamson et al. | 714/785 |
| 6,618,215 B1 | 9/2003 | Fung et al. | 360/31 |
| 2002/0048108 A1* | 4/2002 | Chu et al. | 360/53 |
| 2002/0048112 A1* | 4/2002 | Chu et al. | 360/75 |
| 2002/0063559 A1* | 5/2002 | Richter | 324/212 |
| 2003/0035235 A1 | 2/2003 | Ikeda et al. | 360/59 |
| 2003/0206359 A1* | 11/2003 | Hashimoto | 360/53 |
| 2004/0129877 A1* | 7/2004 | Mankos et al. | 250/307 |

* cited by examiner

FIG. 1
( KNOWN )

HIGH THROUGHPUT MISSING PATTERN DETECTOR FOR SERVO PRINTED RECORDING MEDIA

BACKGROUND OF THE INVENTION

1. Field of the Invention

The present invention relates to the formation of a magnetic pattern on a recording medium such as a magnetic disc. Still further, the invention is directed to the verification of servo patterns placed onto a magnetic disc. The present invention further pertains to a method for detecting missing servo patterns at very fine scales.

2. Description of the Related Art

The computer industry employs magnetic discs for the purpose of storing information. For example, computer systems employ disc drive systems for transferring and storing large amounts of data between magnetic discs and the host computer. The magnetic discs tend to be circular in shape, and are fabricated as a series of discrete layers. The operative layer of any disc is a "magnetic layer" that resides intermediate the series of layers. Because of the thin geometry of the magnetic layer, magnetic information storage discs are sometimes referred to as "thin film magnetic discs."

Figure 1:
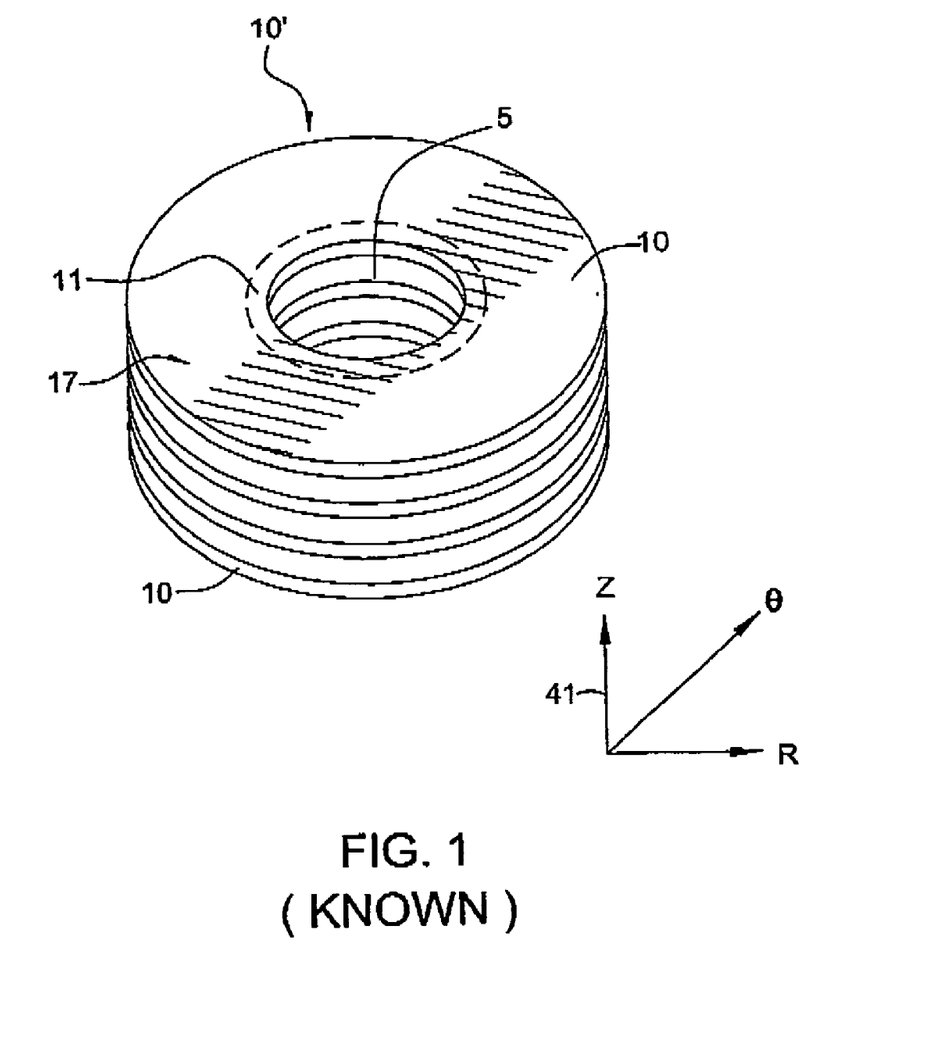
FIG. 1 presents a perspective view of magnetic media, i.e., thin film magnetic discs, as are commonly employed for information storage. In this view, a plurality of stacked discs is shown.

FIG. 1 presents a perspective view of magnetic media 10 as are commonly employed for information storage. In this view, a plurality of stacked magnetic discs 10' is shown. The discs 10' are shown in FIG. 1 in vertical alignment as is common within a disc drive system. In this respect, each disc 10 has a central concentric opening 5 for receiving a spindle (shown at 51 in FIG. 3). A rotary motor drives the spindle 51, causes the discs 10 of the disc pack 10' to rotate in unison.

Each disc 10 is typically fabricated from a series of layers that includes at least a substrate and a magnetic layer. The substrate provides the structural integrity for the magnetic medium 10. The substrate may be fabricated from a nickel-phosphorus plated aluminum disc, or other material such as glass or manganese-oxide. The magnetic layer is uniformly applied on the substrate. The magnetic layer is preferably formed of a cobalt-based alloy, such as a cobalt-chromium-tantalum alloy, though other types of magnetic layers are known.

To enhance the durability of the disc 10, an overcoat (not shown) is preferably deposited over the magnetic layer. The overcoat helps reduce wear of the magnetic media 10 due to contact with a magnetic read-write head assembly (not shown in FIG. 1). The overcoat also aids in corrosion resistance for the magnetic media 10. The overcoat preferably is a layer of sputtered amorphous carbon, though other materials such as sputtered ceramic zirconium oxide and amorphous films of silicon dioxide are suitable.

An exemplary magnetic medium 10 may also have a lubricant layer. The lubricant layer (not shown) also assists in reducing wear and corrosion of the magnetic media. The lubricant is preferably a perfluoropolyether-based (PFPE) lubricant having a thickness of 10 to 20 Angstroms.

It should be noted that the present invention is not limited to any particular type of magnetic medium. In this regard, the discs 10 of FIG. 1 and the description above are purely exemplary, and any disc structure may be used for the methods of the present invention so long as the media generates magnetic flux.

During fabrication, the magnetic layer is deposited as a homogeneous layer in both the radial and circumferential directions. At that point, the magnetic layer carries no magnetic charge. After deposition of the magnetic layer, information is magnetically written onto the medium 10. The magnetic information provides numerous aligned magnetic domains in the structure of magnetic layer, allowing data to be read by sensing the alternating direction of magnetization. More specifically, a magnetic read head (not shown in FIG. 1) senses transition locations where the direction of aligned magnetic domains reverses within the magnetic layer. The magnetic transition patterns are known as "servo burst" patterns. These patterns are shown at 26 in FIG. 2, and will be described in greater detail below.

Figure 2:
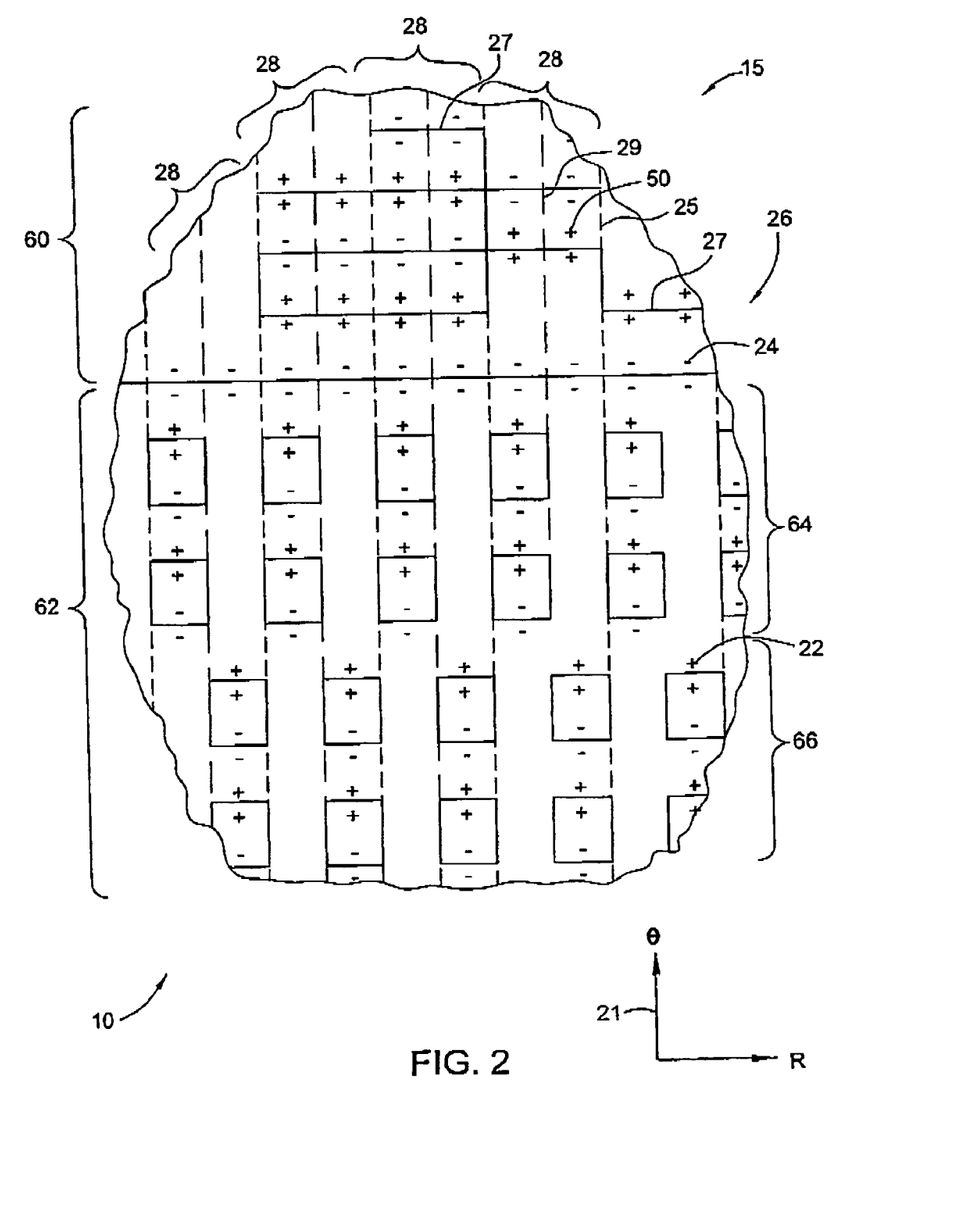
FIG. 2 schematically shows an exemplary portion of servo-pattern information magnetically recorded on a disc of FIG. 1. Magnetization signs indicate the direction of magnetization from the aligned magnetic domains.

FIG. 2 schematically shows an exemplary portion of servo-pattern information 26 magnetically recorded on a disc 10. Magnetization signs 22, 24 indicate the direction of magnetization from the aligned magnetic domains. In FIG. 2, transition boundaries 27 between areas of opposite magnetic domain alignment are shown in solid lines. It can also be seen that servo patterns are placed side-by-side along essentially concentric tracks 28. The boundaries 25 of each track 28 are shown in small dashed lines, and a centerline 29 of each track 28 is shown in larger dashed lines. It is understood that the boundaries 25 of each track 28 and the centerlines 29 are not recognizable by any physical properties of the magnetic layer 15, but are shown for conceptual purposes only. A servo burst pattern commonly has dimensions of 10 to 20 micrometers in the tangential direction and dimensions of a track width (about 0.1 micrometer) in the radial direction.

Figure 3:
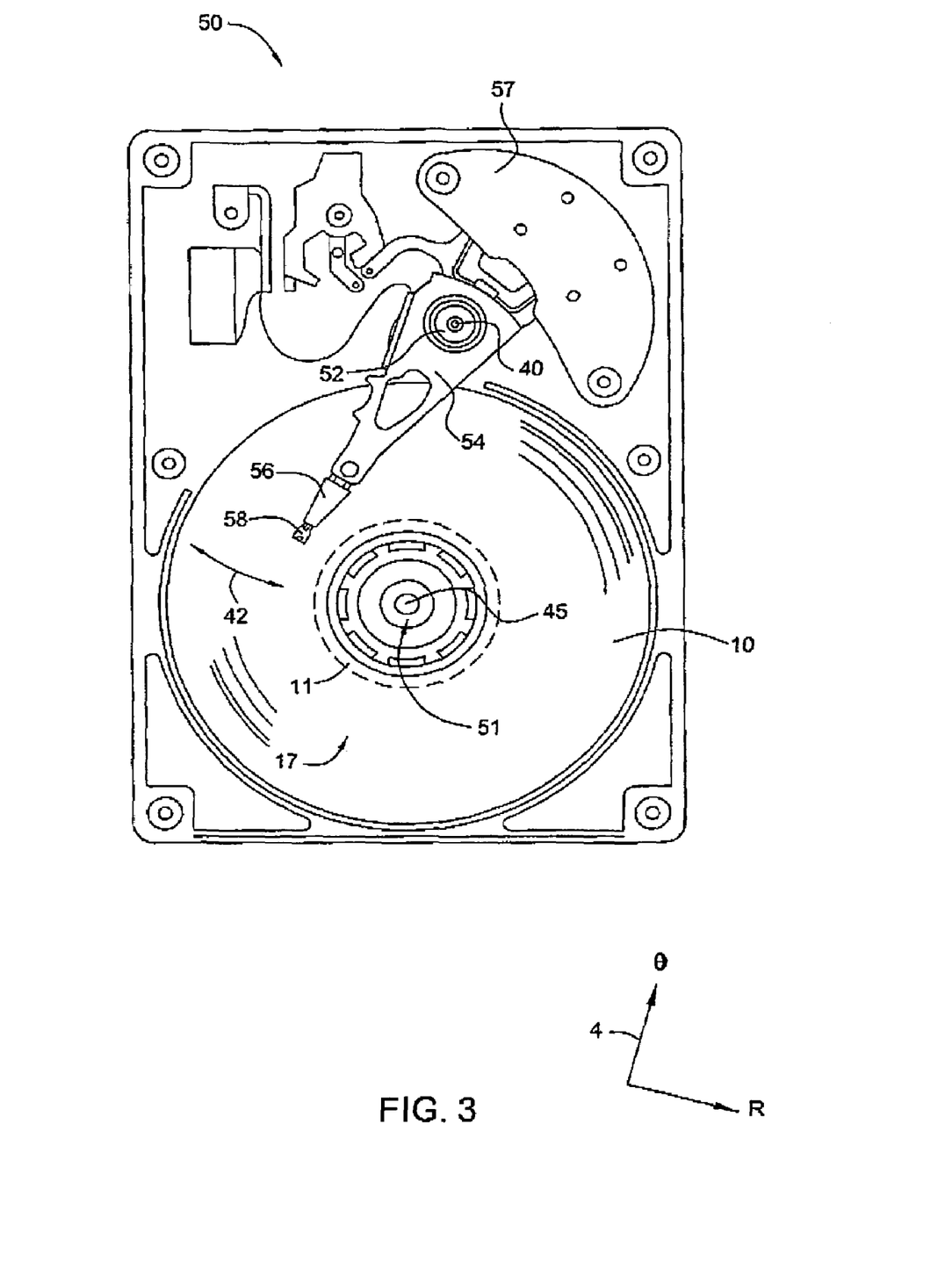
FIG. 3 presents a top view of an exemplary disc drive assembly.

In operation, information stored in the magnetic layer of the disc 10 is read by a magnetic head assembly. The magnetic head assembly is part of a disc drive system, such as the system 50 shown in FIG. 3. FIG. 3 presents a top view of an exemplary disc drive system 50, with the magnetic head assembly seen at 58. The disc drive assembly 50 includes a servo spindle 52 and an actuator arm 54. The servo spindle 52 is motorized to pivot about an axis 40. More specifically, the servo spindle 52 is selectively positioned by a voice coil motor 57 which pivots the actuator arm 54, causing the arm 54 to move through arc 42. In this manner, the arm 54 can be positioned over any radial location "R" along the rotating disc surface.

The actuator arm 54 carries a flexure arm or "suspension arm" 56. The suspension arm 56, in turn, supports the magnetic head assembly 58 adjacent a surface of a disc 10. The head assembly 58 defines a transducer that is capable of reading magnetic information from the magnetic layer of the disc 10, or writing additional information on a reserved portion of the disc 10. The magnetic head 58 is typically placed on a small ceramic block, also referred to as a slider. The slider is aerodynamically designed so that it "flies" over the disc 10 as the disc is rotated at a high rate of speed.

As noted, the disc 10 itself is supported on a drive spindle 51. The drive spindle 51 rotates the disc 10 relative to the magnetic head assembly 58. The disc rotates about axis 45. As the disc 10 rotates, the air bearing slider on the head 58 causes the magnetic head 58 to be suspended relative to the rotating disc 10. The flying height of the magnetic head assembly 68 above the disc 10 is a function of the speed of rotation of the disc 10, the aerodynamic lift properties of the slider along the magnetic head assembly 58, and a biasing spring tension in the suspension arm 56.

It should be noted at this point that the typical disc drive system 50 is able to accommodate multiple discs 10, as shown in the disc stack 10' of FIG. 1. To this end, the drive spindle 51 receives the central openings 5 of the respective discs 10. Separate suspension arms 56 and corresponding magnetic head assemblies 58 (not shown in FIG. 3) reside above each of the discs 10.

Each disc 10 has a landing zone 11 where the magnetic head assembly 58 lands and rests when the disc drive 50 is turned off. When the disc drive assembly 50 is turned on, the magnetic head 58 "takes off" from the landing zone 11. Each disc 10 also has a data zone 17 where the magnetic head 58 flies to magnetically store or read data.

As noted, the servo spindle 52 pivots about pivot axis 40. As the servo spindle 52 pivots, the magnetic head assembly 58 mounted at the tip of its suspension arm 56 swings through arc 42. This pivoting motion allows the magnetic head 58 to change track positions on the disc 10. Polar coordinates 41 are established based on the geometry of the disc 10. The perpendicular distance from the axis 45 to any location on the disc 10 is defined by a radius R, while the circumferential dimension is denoted by azimuthal dimension 0. An optional vertical distance Z may be provided (shown in FIG. 1) where multiple discs 10 are stacked.

The ability of the magnetic head 58 to move along the surface of the disc 10 allows it to read data residing in tracks (shown in FIG. 2) along the magnetic layer 15 of the disc. Each read/write head 58 generates or senses electromagnetic fields or magnetic encodings in the tracks of the magnetic disc as areas of magnetic flux. The presence or absence of flux reversals in the electromagnetic fields represents the data stored on the disc. The disc drive 50 must be able to differentiate between tracks 28 on the disc 10 and to center the magnetic head 58 over any particular track 28. To accomplish this, most disc drives 50 use embedded "servo patterns" 26 of magnetically recorded information on the disc 10. The servo patterns 26 are read by the magnetic head 58 to inform the disc drive 50 of track location.

The exemplary servo pattern includes "gray code" (shown at 60 in FIG. 2) and "servo burst" (shown at 62 in FIG. 2). The gray code indexes the radial position of the track such as through a track number, and may also provide a circumferential index such as a sector number. The servo burst is a centering pattern to precisely position the head over the center of the track. Each servo burst includes magnetic transitions 64, 66 on the inside of the track 28 interleaved with magnetic transitions on the outside of the track 28. If the magnetic head 58 is centered over the track 28, the signal read from the inside transitions (shown at 64 in FIG. 2) will be equal and opposite to the signal read from the outside transitions (shown at 66 in FIG. 2) If the magnetic head 58 is toward the inside of the track 28, the signal from the inside transitions will predominate, and vice versa. By comparing portions of the servo burst signal 26, the disc drive 50 can iteratively adjust the head location until a zeroed position error signal is returned from the servo bursts, indicating that the head 58 is properly centered with respect to the track 28. Additional details concerning various configurations of servo patterns is presented in U.S. Pat. No. 5,991,104 entitled "Using Servowrite Medium for Quickly Written Servo-Patterns on Magnetic Media."

Disc drives which magnetically record, store and retrieve information on disc-shaped media are widely used in the computer industry. However, before data can be read from a disc and before a disc can be used in a computer, initial programming and data must be stored on the disc 10. Thus, during manufacturing, servo information is encoded on the disc and subsequently used to accurately locate the transducer 58. In contrast to data sections, servo patterns are written only once and are not written over by the magnetic head during operational use of a disc drive. The servo pattern information, and particularly the track spacing and centering information, needs to be located very precisely on the disc tracks. Most storage discs utilize a multiplicity of concentric circular tracks, though some discs have a continuous spiral forming a single track on one or both sides of the disc.

Various means are known for recording information on a disc 10. In one arrangement, a write transducer, or "servo track writer," (not shown) is placed on a magnetic head assembly similar to the one shown in FIG. 3. A write transducer is used to record information on the disc 10, including servo patterns. At the time the servo information is written, the disc drive is typically at the head disc assembly stage. The head disc assembly includes most of the mechanical drive components shown in FIG. 3, but does not typically include all the drive electronics and may only read on one disc 10 rather than a disc pack 10' During the track writing process, the servo track writer precisely locates the transducer heads relative to the disc surface and writes the servo information thereon. Accurate location of the transducer head is necessary to ensure that the track definition remains concentric.

The write transducer creates a highly concentrated magnetic field. During writing, the strength of the concentrated magnetic field directly under the write transducer is greater than the coercivity of the recording medium (known as "saturating" the medium). Grains of the recording medium at that location are magnetized with a direction that matches the direction of the applied magnetic field. The grains of the recording medium retain their magnetization after the saturating magnetic field is removed. As the disc 10 rotates, the direction of the writing magnetic field is alternated based on bits of information being stored, thereby recording a magnetic pattern on the track directly under the write transducer.

More recently, faster and more reliable means have been developed for writing data onto a magnetic disc. These methods include the use of a pre-formatted magnetic stamper that conveys data to an unformatted magnetic disc. Examples of such writing or "stamping" methods are described in U.S. Pat. No. 5,991,104 and U.S. Pat. No. 6,181,492, each of which is entitled "Using Servowrite Medium for Quickly Written Servo-Patterns on Magnetic Media." The '104 and '492 patents were each assigned to Seagate Technology, LLC. Under these patents, a master disc having a pre-formatted magnetic pattern is placed in close proximity to a "slave disc." A strong magnetic field is applied to the slave disc to form a uniform direction of premagnetization in the medium. The pre-magnetized medium is then brought into contact with a master for servo printing. The pre-magnetized medium is exposed to a uniform magnetic field through the master, sometimes referred to as a "stamper." Thus, servo information is transferred via fringing magnetic fields emanating from the pattern previously imposed upon the stamper. The result is that the magnetic pattern from the master is formed in the slave disc.

Using magnetic stamper technology, servo pattern information may be quickly imparted onto a blank disc 10. This technology is sometimes referred to as "servo media printing."

At the time servo patterns are written, there are no reference locations on the disc surface which can be perceived by the master disc (or a servo track writer); rather, the method of contact servo printed media relies upon the direct transfer of magnetic patterns from the stamper to a disc. For this magnetic transfer of information to be effectuated, an extremely narrow interface between the stamper and the blank disc is required. Stated another way, in order to effectuate servo media printing and to replicate the very fine sub-micron features of the servo pattern, an extremely small interface is required between the stamper and the blank disc. For this reason, the method of contact servo printed media is very sensitive to any disturbances that interfere with the close mechanical relationship. Mechanical defects in the stamper or even unwanted dust particles on the stamper face may interfere with the stamper/disc blank interface. The result of such disturbances is that areas of missing servo pattern may be formed.

It is desirable to ensure that there are no areas of missing servo pattern on the disc. In this respect, magnetic storage of information must be virtually 100 percent error free for a disc to be operational. Therefore, a full surface test is desired for every printed disc.

U.S. Pat. No. 6,373,243 entitled "Magnetic Media Tester for Testing a Servo Signal Prerecorded in a Magnetic Media" issued in 2002. This patent provides a device for testing magnetic media such as a disc. Among other features, the tester comprises a voice coil motor disposed on a rotary positioner, and a pair of magnets sandwiching the voice coil The device allows a magnetic head to be precisely positioned for testing by the same construction as a hard disc drive of the actual machine. In this way, signals can be accurately generated by the magnetic media tester to determine the placement of servo pattern information.

Despite the contribution of the '243 patent, a need exists to conduct a full surface test in a more expeditious manner. A full surface test must possess the properties of high throughput and low cost in order to be compatible with the economic constraints of memory disc manufacturing.

SUMMARY OF THE INVENTION

The present invention provides a method for detecting missing servo patterns on a magnetic medium, such as a printed recording medium In general, the method comprises the first step of generating a map of anticipated servo burst patterns for a magnetic medium. The magnetic medium is typically a magnetic storage disc. Next, the magnetic medium is placed onto a disc reading assembly. Using the disc reading assembly, individual servo bursts on the magnetic medium itself are identified.

The disc reading assembly is preferably the magnetic media tester described in U.S. Pat. No. 6,373,243. In one embodiment, the disc reading assembly generally comprises a spindle motor for receiving and rotating the magnetic disc at a desired speed, a magnetic recording head disposed at the distal end of a positioning arm, and a mechanism for controlling the positioning arm. The magnetic head reads servo patterns on the magnetic disc, while the control mechanism moves the positioning arm and connected magnetic head above the surface of the disc as the magnetic head reads the servo patterns.

Movement of the magnetic head is controlled by a computer. The computer directs signals to the arm for moving the magnetic head, and rapidly samples signals received from the magnetic head. Signals generated from the magnetic head are in analog form, and represent a power value as read from various disc sectors. The computer correlates the power values to the polar coordinate at which the data was read.

Multiple signals are sampled along a given track of a disc. Sampling frequency is high enough to ensure that at least several samples will be taken of every given data sector. Preferably, eight to ten initial samples will be taken of each sector location. At the same time, such high frequency sampling makes detection of a servo burst along a given data sector difficult to identify and process. In this respect, those of ordinary skill in the art will appreciate from the disclosure herein that individual signal readings will fluctuate so that identification of servo burst patterns, indicated by peak detection, are obfuscated. Thus, it is desirable to convert the frequency down before the signals are digitized. Frequency-down conversion coupled with band pass filtering and rms-DC conversion allows multiple individual signals to be smoothed out so that individual values can be identified and digitized. In addition, less data is analyzed by the software, thereby speeding the servo pattern detection process.

In one embodiment, the frequency-down conversion process is done using a spectrum analyzer operating in the zero span mode. In the zero-span mode, the spectrum analyzer detects the power in a specified portion of the spectrum as a function of time, thus providing the functions of RF down conversion, band pass filtering, and rms-DC conversion. Since the servo information is presented at a particular frequency, the spectrum analyzer provides an effective and convenient method of detecting only the servo signal. From there, the manipulated servo signals are digitized. In one arrangement, a LeCroy digitizing oscilloscope is used as the digitizer.

After an initial servo burst is identified, the anticipated sector location of additional servo bursts is known. The magnetic head then samples magnetic flux at those locations. Those signals are likewise processed and digitized so that a map of actual servo bursts may be generated. The generated data is analyzed by a map comparison algorithm. In this respect, the map comparison algorithm compares the map comprising the expected locations of the servo signals against the detected locations of the servo signals. Portions of the real map that are expected to show the presence of a servo signal but do not do so are deemed to be areas of missing servo pattern. In the preferred algorithm, the comparison is made on a track-by-track basis, though the comparison may be made in real time, or after the entire disc has been scanned.

BRIEF DESCRIPTION OF THE DRAWINGS

So that the manner in which the above recited features of the present invention can be understood in detail, a more particular description of the invention, briefly summarized above, may be had by reference to the appended drawings. It is to be noted, however, that the appended drawings (FIGS. 5–11) illustrate only typical embodiments of this invention and are therefore not to be considered limiting of its scope.

DETAILED DESCRIPTION OF THE PREFERRED EMBODIMENT

Figure 4:
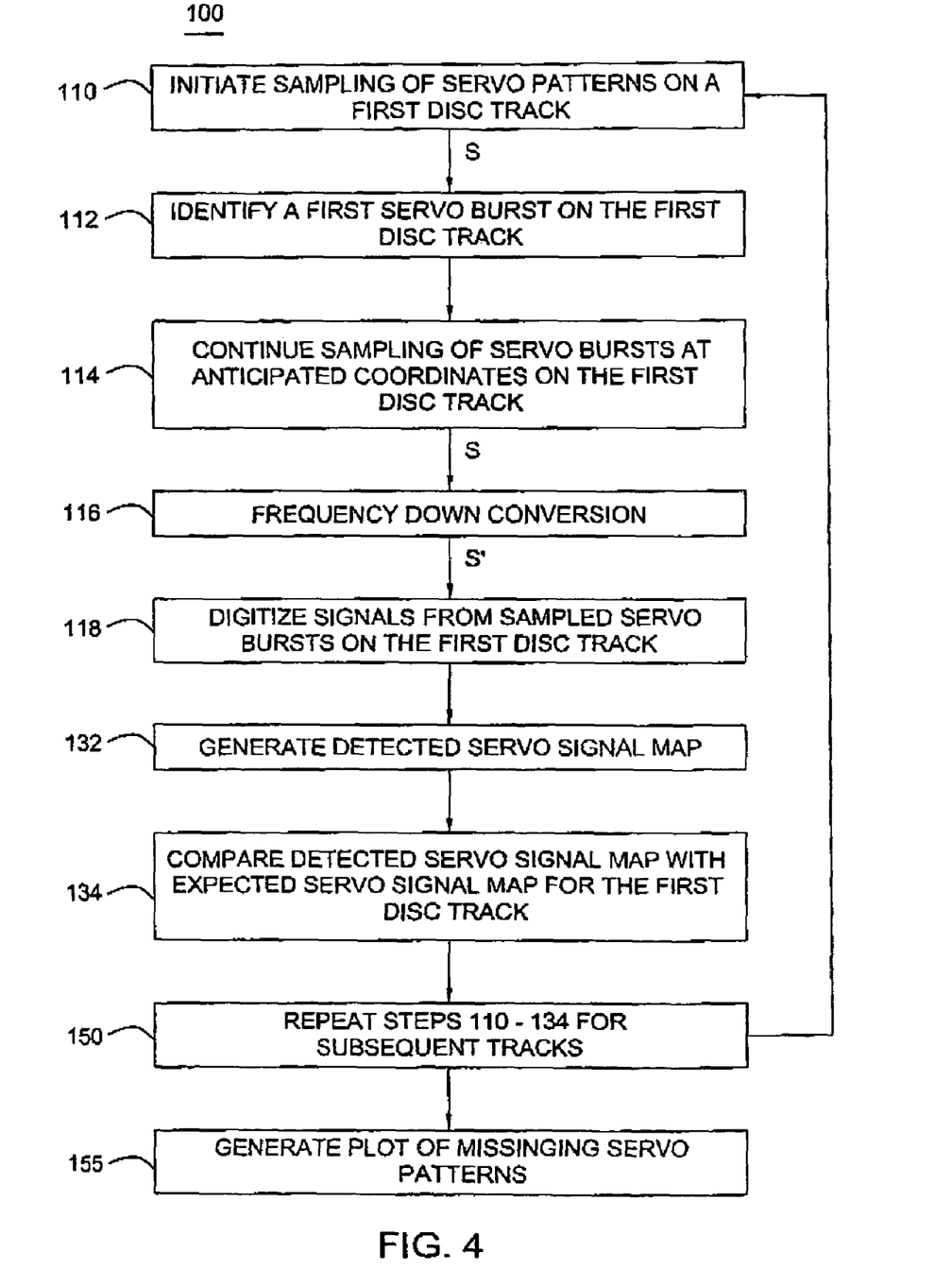
FIG. 4 is a flow chart demonstrating steps of the servo pattern detection method of the present invention, in one embodiment.
Figure 5:
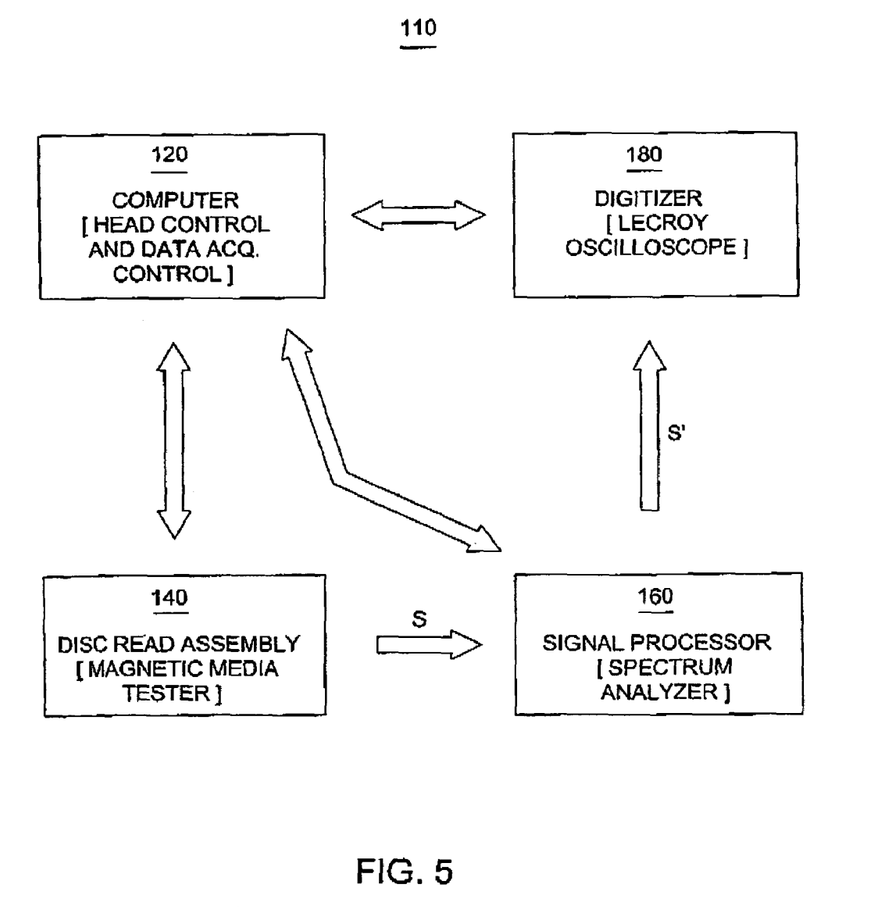
FIG. 5 is a flow chart demonstrating the interrelationship of components for performing the steps of FIG. 4.

The present invention provides a method for detecting missing servo patterns on a recorded medium, such as printed recording media. FIG. 4 presents a flow chart demonstrating steps of the servo pattern detection method 100 of the present invention, in one embodiment. FIG. 5 is a flow chart demonstrating the interrelationship of components for performing the steps of FIG. 4.

The first step shown in FIG. 4 is to initiate the sampling of servo patterns. This initiation step is shown schematically in block 110 of FIG. 4. This step references the beginning of sampling of servo sectors on a magnetic disc 10, along a single track.

To accomplish this initial sampling step 110, a disc reading assembly is provided. The disc reading assembly is schematically shown at block 140 in FIG. 5. The disc reading assembly 140 receives the magnetic disc 10 to be tested. The disc reading assembly 140 represents the hardware for manipulating the disc being tested and for moving the reading instrument, i.e., magnetic head, across the disc 10.

In general, the disc reading assembly 140 comprises a means for spinning the disc on a spindle at relatively high rotation rates, a means for positioning a magnetic head at the distal end of the spindle over the disc, and a read channel for reading servo pattern signals S detected by the magnetic head. In one embodiment, the disc reading assembly 140 is the spin stand test platform produced by Seagate Technology, known as an ECTS. ECTS is an acronym for Electrical Common Test System. The ECTS includes the means for supporting and spinning of a disc, positioning the head, and provision of the magnetic recording replay channel.

An acceptable embodiment of a spin stand test platform is described in U.S. Pat. No. 6,373,243, entitled "Magnetic Media Tester for Testing a Servo Signal Prerecorded in a Magnetic Media." The reader is respectfully referred to the '243 patent for a detailed description of a disc reading assembly 140 as might be used in connection with step 110 of the present invention.

For purposes of clarity herein, it is noted that the magnetic media tester described in the '243 patent, in its general sense, first comprises a spindle. The spindle receives and rotates a magnetic disc at a desired speed during testing. The spindle is driven by a motor that imparts rotational movement to the spindle and connected disc. Next, the disc reading assembly 140 comprises a suspension arm. The suspension arm (referred to in the '243 patent as a rotary positioner 140 carries a magnetic head at a distal end. At its opposite proximal end, the suspension arm pivots in order to move the magnetic head to different radial positions above the disc. Third, the disc reading assembly 140 comprises a control mechanism for controlling the position of the suspension arm and the connected magnetic head. In one arrangement described in the '243 patent, a voice coil motor is provided at the proximal (pivoting) end of the suspension arm for controlling the arm. The voice coil is sandwiched between two magnets. The magnets serve to aid in positioning the magnetic head so that the magnetic head may read servo patterns at the same position as the hard disc drive. A lock pin (shown at 101 of FIG. 5 of the '243 patent) may also be provided for further regulating the position of the suspension arm.

In operation, the magnetic read head of the disc reading assembly 140 is moved into position over the surface of the disc 10 so that it is aligned over a first track. The disc 10 is rotated oh the drive spindle so that the slider holding the magnetic reader flies over the track.

Radial movement of the magnetic head is controlled by a computer. The computer is shown schematically at block 120 of FIG. 5. The computer directs signals to the arm for moving the magnetic head. The computer 120 also monitors the location of the magnetic head as signals are read above the disc. In this respect, the coordinates of the magnetic head are registered by the computer. The perpendicular distance from the center of the disc to any location on the disc is defined by a radius R, while the circumferential dimension is denoted by azimuthal dimension θ. The computer correlates recorded values to their respective polar coordinates.

During a servo pattern scan 110, the magnetic test head is moved in the radial direction along the disc, either in a spiral mode or a discrete step mode. As the magnetic head moves relative to the disc 10, the magnetic head rapidly samples signals received from the first track below. The magnetic head detects magnetic flux emanating from servo sectors embedded within the disc 10, and converts them into an electrical signal proportional to the degree of magnetic flux sampled Signals generated from the magnetic head 58 are in analog form, and represent a power value as read from various disc sectors. The computer 120 correlates the power values to the polar coordinate at which the signals S were read. These signals are then processed. The signal processing step is shown generally in block 160 of FIG. 5.

Multiple samples are taken along a given first track of a disc 10. Sampling frequency is high enough to ensure that at least several samples will be taken of every given data sector along the first track. Those of ordinary skill in the art will appreciate that a magnetic disc may have up to 250 sectors in a track, and 300 to 500 tracks on a disc. Preferably, eight to ten samples will be taken of each sector location. At the same time, Such high frequency sampling makes detection of a servo burst along a given data sector difficult to identify and process. Those of ordinary skill in the art will appreciate that servo burst waveforms can be somewhat amorphous such that identification of servo burst patterns, determined by peak detection, are obfuscated. Thus, it is desirable to down-convert the frequencies before the signals S are processed through a peak detection algorithm. Frequency-down conversion allows multiple individual signals to be smoothed out so that servo signals S can be identified, and their power values digitized. In addition, the frequency-down conversion process permits less data to be analyzed by the software, thereby speeding the servo pattern detection process.

The frequency-down conversion may be accomplished either digitally or through analog instruments. In one analog embodiment herein, the functionality of these components is accomplished by using a spectrum analyzer operating in the zero span mode. In the zero-span mode, the spectrum analyzer detects the power in a specified portion of the spectrum as a function of time, thus providing the functions of RF down-conversion, band pass filtering, and rms-DC conversion. Since the servo information is presented at a particular frequency, the spectrum analyzer provides an effective and convenient method of detecting only the servo signal. Thus, the signal processor 160 is preferably a spectrum analyzer operating in the zero span mode, and a new signal S' is generated that represents a servo burst.

The processed signals S' from the signal processor 160 are digitized. In the preferred embodiment, the digitizing function is provided by a LeCroy digitizing oscilloscope. The interactive digitizing function is shown in block 180 of FIG. 5 Each sampled signal S' is thus given a digital value.

Referring back to step 110 of FIG. 4, when the initial sampling is taken, the disc reading assembly 140 does not know where the first servo pattern is. Thus, a next step must be taken to identify a first servo burst. This step is shown at schematic block 112. In one arrangement, a determined number of samples S are taken. These samples are processed in real time using the signal processor 160. From these signals, the computer 120 quickly identifies a servo burst from the initial samples. From there, the computer 120 knows where subsequent servo bursts in a given track will be located based upon the rotational speed of the disc and the radial location of the head. These factors determine the increments of time in which samples should be taken. Thus, the computer 120 knows to take future sector samples at known servo burst locations, and at known microsecond intervals. The ability to bypass data segments to read only servo burst patterns further enhances the throughput capability of the method 100 of the present invention.

Block 114 of FIG. 4 presents the next step in the servo pattern detection method 100. This block 114 represents the continued sampling of servo bursts at the anticipated coordinates on the first disc track. As signals S are detected, they are processed in the signal processor 160 as described above. The processed signals S' are then digitized using the LeCroy digital oscilloscope 180.

Figure 6A:
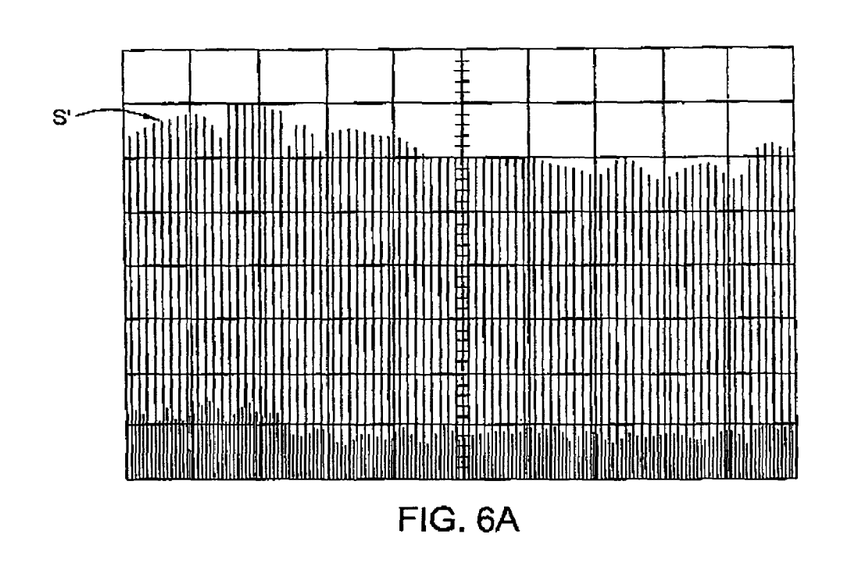
FIG. 6A shows output from a spectrum analyzer.
Figure 6B:
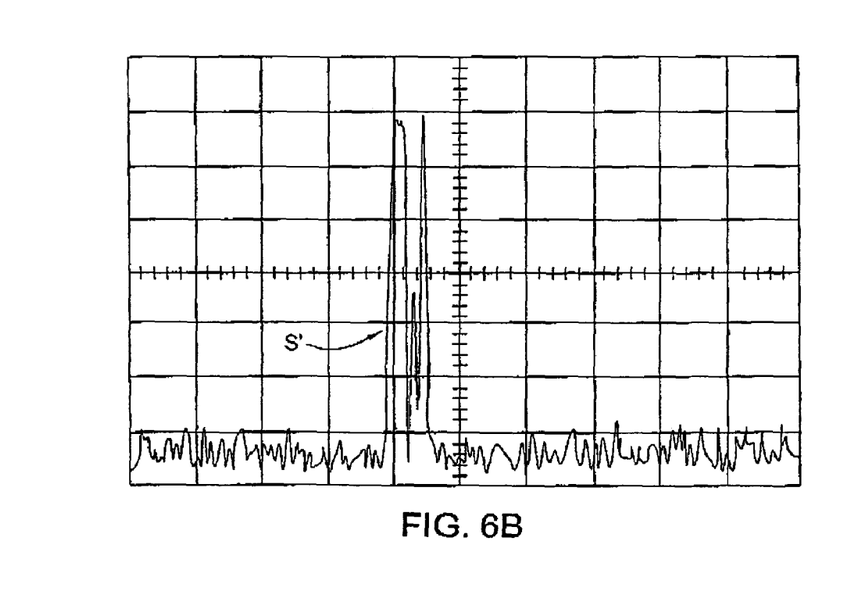
FIG. 6B is an enlarged view of a portion of the spectrum analyzer output from FIG. 6A.

The sampling operation is synchronized with both the rotational motion of the disc and the radial motion of the test head. Each sample thus acquired can then be associated with a physical coordinate location on the disc surface. Once all signals from a given track have been collected in digital form, a map is formed of detected servo patterns along that track. Block 132 of FIG. 4 demonstrates the step of generating a detected servo signal map. In one aspect, the map defines a table or other stored values, whereby processed signal values are correlated to their respective polar coordinates. These values S' may also be printed out in graphical form. FIGS. 6A and 6B show output from the LeCroy digitizing oscilloscope 170. FIG. 6A presents signals generated from one disc revolution. Numerous power spikes are shown in the chart, representing individual servo bursts S'. FIG. 6B is an enlarged view of a portion of the signal chart of FIG. 6A. Showing a single identified servo burst S'.

Figure 7:
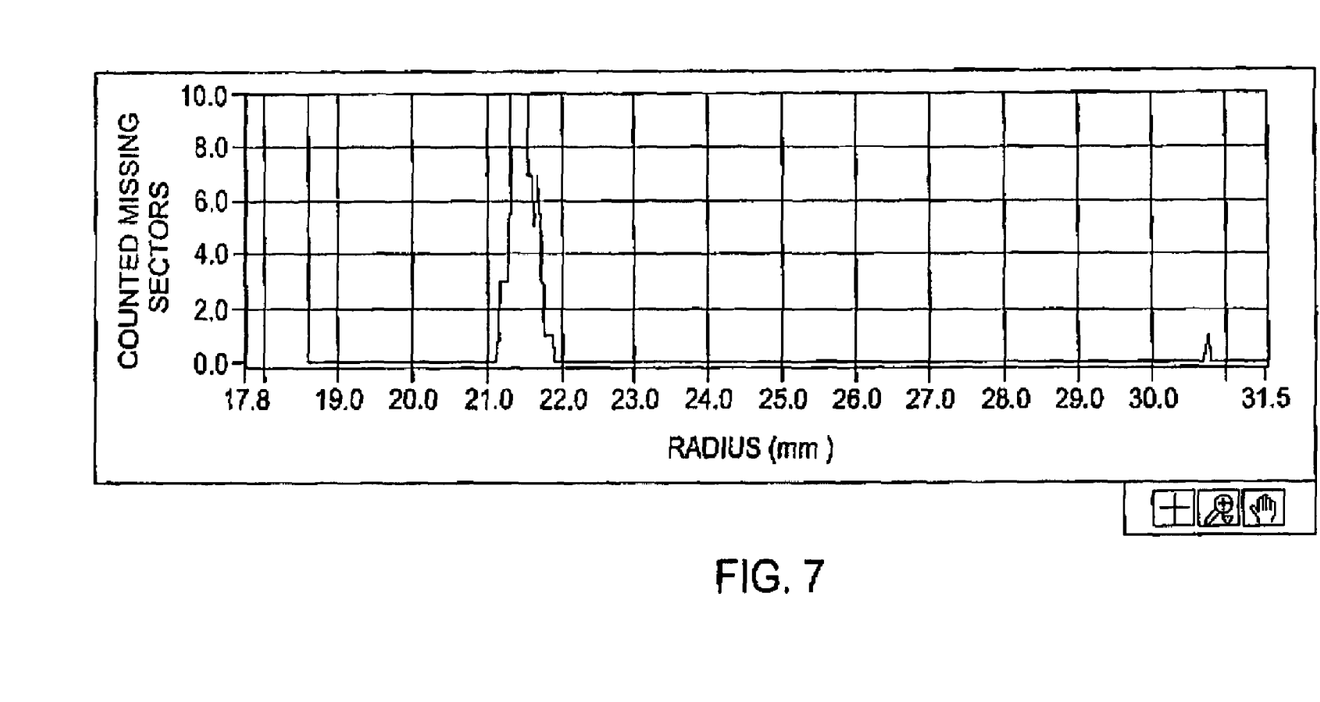
FIG. 7 provides a graph of disc radius (x-axis) vs. missing sector count (y-axis).

As a next step, the data from step 118 is compared to an expected servo signal map for the first analyzed disc track. The comparison step is accomplished through a comparison algorithm, and is represented by block 134 of FIG. 4. Portions of the read sectors that are expected to show the presence of a servo signal but do not do so are deemed to be areas of missing servo pattern. As an option, a graph can be generated showing missing servo signals in a given track. FIG. 7 provides such a graph, presenting missing sector count (y-axis) as a function of a disc radius (x-axis).

The steps of 110–134 are repeated for subsequent tracks. In this way, a complete detected servo signal map may be compiled, with detected servo signals S' from each track compared to the expected servo signal pattern for each track. The loop of repeating steps 110–134 is shown at block 150. By setting a discrimination threshold, areas of missing servo patterns can then be identified.

It is understood that the comparison step 134 may be conducted at any point. The exemplary algorithm of FIG. 4 presents the comparison step 134 being made track-by-track. However, the comparison step 134 may alternatively be taken at one extreme in real time as individual servo bursts S' are taken, or at another extreme after an entire disc 10 or portion of disc has been read.

Figure 8:
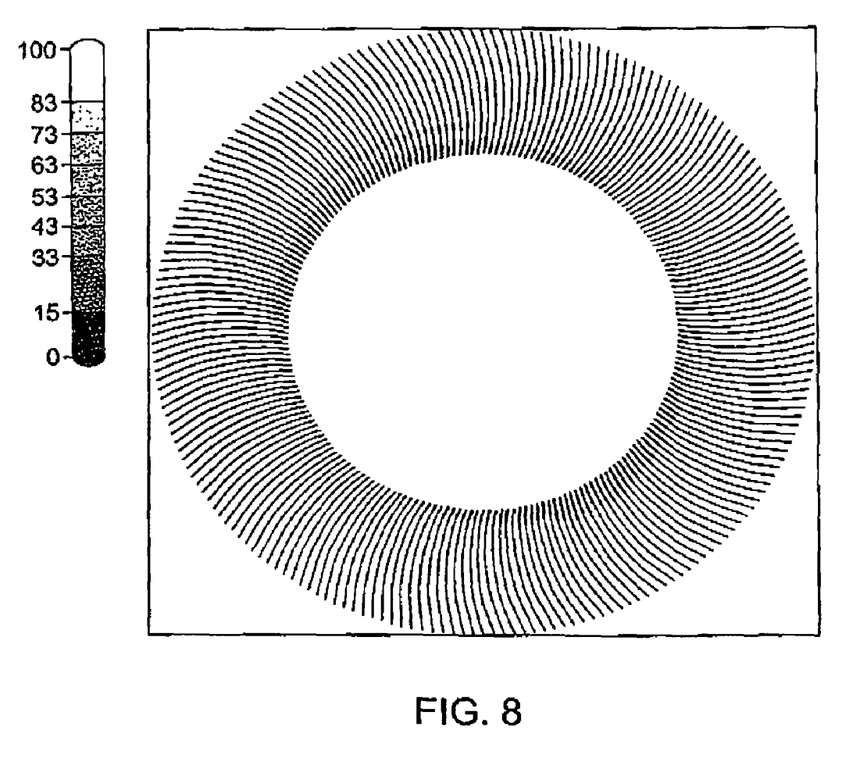
FIG. 8 presents a map of scanned sectors of a disc.

Referring back again to the flow chart of FIG. 4, a next step of the servo pattern detection method 100 of the present invention is seen at block 155. An analysis of missing servo patterns is made. Portions of the real map that are expected to show areas of servo signal, but do not do so, are deemed to be areas of missing servo pattern, In one embodiment, a plot may be generated of missing servo patterns. FIG. 8 shows a plot of the normalized servo signal power as a function of the position coordinates: radius and azimuthal angle. The various scanned sectors are represented. Those servo patterns detected as missing are mapped on the radial chart of FIG. 8. The detection algorithm is then considered done.

It is noted, as an alternative, that an angular offset step could be introduced to the algorithm at the end of the sampling. It is possible that there could be a mismatch between the ideal map and the actual map sampled. If this occurs, an angular offset may be introduced to provide the best alignment, in a least squared sense, between the ideal and actual maps.

The method 100 presented in this disclosure enables the operator to detect missing servo patterns on the scale of a servo burst. A servo burst has dimensions of 10 to 20 micrometers in the tangential direction and dimensions of a track width (about 0.1 micrometer) in the radial direction. It can be seen that because only selective sampling is employed, the data gathering and data processing requirements of the prior art are reduced. In addition, high throughput testing is enabled through the use of frequency down conversion coupled with band pass filtering and rms-DC conversion.

While the foregoing is directed to embodiments of the present invention, other and further embodiments of the invention may be devised without departing from the basic scope thereof, and the scope thereof is determined by the claims that follow.

We claim:

1. A method for detecting missing servo patterns on printed magnetic media, the printed magnetic media having a plurality of tracks thereon, the method comprising the steps of:
    generating a map of anticipated servo burst patterns for a magnetic medium;
    placing the magnetic medium onto a disc reading assembly;
    identifying servo bursts on the magnetic medium using the disc reading assembly;
    generating a map of identified servo bursts on the magnetic medium; and
    comparing the map of identified servo burst patterns with the map of anticipated servo bursts to identify missing servo bursts on the magnetic medium.

2. The method for detecting servo patterns of claim 1, wherein:
    the disc reading assembly comprises a magnetic reading head; and
    the step of identifying servo bursts on the magnetic medium comprises the steps of:
        passing the magnetic reading head over a selected track of the magnetic medium,
        sampling magnetic flux on the selected track of the magnetic medium using the magnetic reading head at initial servo pattern locations, the magnetic reading head providing an output signal of power proportional to the degree of magnetic flux sampled; and
        processing the sampled output signals for the initial servo pattern locations by performing a frequency down conversion coupled with band pass filtering and rms-to-DC conversion.

3. The method for detecting servo patterns of claim 2, wherein the sampled output signals are processed digitally.

4. The method for detecting servo patterns of claim 2, wherein the sampled output signals are in analog form.

5. The method for detecting servo patterns of claim 4, wherein the step of processing the sampled output signals is performed by a spectrum analyzer operating in the zero-span mode.

6. The method for detecting servo patterns of claim 2, wherein the step of identifying servo bursts on the magnetic medium further comprises the steps of:
sampling magnetic flux at additional servo pattern locations on the selected track of the magnetic medium, the magnetic reading head providing additional output signals of power proportional to the degree of magnetic flux sampled; and
processing the additional sampled output signals by performing a frequency down conversion coupled with band pass filtering and rms-to-DC conversion.

7. The method for detecting servo patterns of claim 6, wherein the sampled output signals are processed digitally.

8. The method for detecting servo patterns of claim 6, wherein the sampled output signals are in analog form.

9. The method for detecting servo patterns of claim 8, wherein:
the step of processing the initial sampled output signals is performed by a spectrum analyzer operating in the zero-span mode; and
the step of processing the additional sampled output signals is performed by a spectrum analyzer operating in the zero-span mode.

10. The method for detecting servo patterns of claim 6, wherein the step of sampling magnetic flux at additional servo pattern locations comprises the steps of:
identifying the anticipated location of additional servo bursts on the selected track; and
sampling magnetic flux at the anticipated locations of the additional servo bursts.

11. The method for detecting servo patterns of claim 10, wherein:
the step of processing the initial sampled output signals is performed by a spectrum analyzer operating in the zero-span mode; and
the step of processing the additional sampled output signals is performed by a spectrum analyzer operating in the zero-span mode.

12. The method for detecting servo patterns of claim 11, further comprising the steps of digitizing the frequency down-converted signals; and
wherein the step of generating a map of identified servo bursts on the magnetic medium comprises generating a map of the digitized signals as a function of location on the selected track.

13. The method for detecting servo patterns of claim 10, wherein the step of identifying servo bursts on the magnetic medium further comprises the step of:
passing the magnetic reading head over all other tracks of the magnetic medium;
sampling magnetic flux on each additional selected track of the magnetic medium using the magnetic reading head at initial servo pattern locations, the magnetic reading head providing an output signal of power proportional to the degree of magnetic flux sampled;
processing the sampled output signals by performing a frequency down conversion coupled with band pass filtering and rms-to-DC conversion;
identifying a first servo burst from the sampled output signals on each additional track;
sampling magnetic flux at additional servo pattern locations on each additional track of the magnetic medium; the magnetic reading head providing additional output signals of power proportional to the degree of magnetic flux sampled; and
processing the additional sampled output signals by performing a frequency down conversion coupled with band pass filtering and rms-to-DC conversion; and
digitizing the frequency down-converted signals from each additional track.

14. The method for detecting servo patterns of claim 13, further comprising the steps of:
preparing a digitized map of expected servo burst locations on the selected track; and
comparing the generated map of the digitized signals to the digitized map of expected servo burst locations on the selected track.

15. A method for detecting missing servo patterns on printed magnetic media, the method comprising the steps of:
placing a magnetic medium into a disc reading assembly;
taking magnetic readings on the disc at selected polar coordinate locations on the disc;
generating a signal output from the magnetic readings correlated with the selected polar coordinates;
processing the generated signal in a spectrum analyzer operating in the zero span mode to identify servo bursts from the generated signals; and
comparing identified servo bursts with the expected servo bursts at the selected polar coordinates in order to detect missing servo patterns.

16. The method for detecting missing servo patterns of claim 15, further comprising the step of:
generating a list of the detected servo burst signals as a function of polar coordinate on the magnetic medium;
preparing a list of expected servo burst signals as a function of polar coordinate on the magnetic medium; and
comparing the list of expected servo burst signals to the list of the detected servo burst signals as a function of polar coordinate on the magnetic medium so as to identify missing servo bursts.

* * * * *